Patented July 23, 1935

2,008,716

UNITED STATES PATENT OFFICE 2,008,716

CELLULOSE DERIVATIVE COMPOSITIONS

Emmette F. Izard, Elsmere, Del., assignor to E. I. du Pont de Nemours & Company, Wilmington, Del., a corporation of Delaware No Drawing. Application July 26, 1933, Serial No. 682,276

2 Claims. (Cl. 106—40)

This invention relates to cellulose derivative compositions and more particularly to cellulose derivative compositions containing esters of monohydric ether alcohols with aromatic acids containing a ketone group.

This case is a continuation in part of Emmette F. Izard copending application, Serial No. 596,153, filed March 1, 1932.

An object of the present invention is the provision of new cellulose derivative compositions containing esters of monohydric ether alcohols with aromatic acids containing a ketone group. Other objects will appear hereinafter.

The above objects are accomplished according to the present invention by incorporating a monohydric ether alcohol ester of an aromatic ketonic acid in a cellulose derivative composition.

These esters may be prepared by reacting the ether alcohol with the aromatic keto acid at a temperature sufficiently high to expel water formed by the reaction at substantially the rate it is formed, and/or using a catalyst such as sulphuric acid, and/or a solvent such as toluene or ethylene dichloride to aid in removing the water. Alternatively, these esters may be prepared by reacting the alkali metal salts of the aromatic acid, such as the sodium or potassium salts, with the chloride of the ether alcohol, or by reacting a simple ester of the ether alcohol with the aromatic acid, or by reacting a simple ester of the aromatic acid with the ether alcohol and removing the acid or alcohol, as the case may be, formed by the reaction.

It is preferred to use an excess molecular proportion of the ether alcohol and to keep the reaction temperature above the boiling point of water, or the binary mixture of water and solvent where a solvent is employed, or the boiling point of the acid or alcohol formed by the reaction where a simple ester of the ether alcohol or the aromatic acid is employed. Obviously the temperature should not exceed the boiling point of the ester being formed.

The following examples are given to illustrate the preparation of these esters:—

*Example 1.—Ethoxyethyl benzoylbenzoate.*—A mixture containing 366 grams of o-benzoylbenzoic acid, 400 grams of ethoxyethanol, and 40 grams sulphuric acid was heated to boiling for 12 hours in an apparatus designed to allow the water of reaction to escape. The excess ethoxyethanol was removed by distillation and the product was poured into cold water, washed with dilute sodium carbonate solution until free of acid, and then vacuum distilled. Ethoxyethyl benzoylbenzoate distills between 220–250° C. at 10 mm. pressure.

*Example 2.—Methoxyethyl benzoylbenzoate.*—A mixture containing 325 grams of o-benzoylbenzoic acid, 175 grams of methoxyethanol, 200 grams of benzene, and 1 cc. concentrated sulphuric acid was heated to boiling in an apparatus designed to return the benzene to the reaction mixture and allow the water of reaction to be removed. When the majority of the organic acid had been removed the product was washed with dilute sodium carbonate solution and then refined by heating to 175° C. at 20 mm. pressure in the presence of decolorizing carbon. Methoxyethyl benzoylbenzoate distills above 200° C. at 10 mm. pressure.

*Example 3.—Butoxyethyl benzoylbenzoate.*—A mixture containing 680 grams of o-benzoylbenzoic acid, 500 grams butoxyethanol, 400 grams ethylene dichloride, and 3 cc. concentrated sulphuric acid was heated in the apparatus described in Example 2 until the theoretical amount of water had been removed. The product was then refined as in Example 2. Butoxyethyl benzoylbenzoate distills above 225° C. at 10 mm. pressure.

*Example 4. — Phenoxyethyl naphthoylbenzoate.*—A mixture containing 140 grams o-naphthoylbenzoic acid, 100 grams phenoxyethanol, 100 grams ethylene dichloride, and 1 cc. concentrated sulphuric acid was heated to boiling in the apparatus described in Example 2 until the theoretical amount of water had been removed. The product was then refined as in Example 2. Phenoxyethyl naphthoylbenzoate distills above 250° C. at 10 mm. pressure.

*Example 5.—Phenoxyethoxyethyl chlorobenzoylbenzoate.*—A mixture containing 132 grams chlorobenzoylbenzoic acid, 125 grams phenoxyethoxyethanol, 100 grams ethylene dichloride, and 1 cc. concentrated sulphuric acid was heated in the apparatus described in Example 2 until the theoretical amount of water had been removed. The product was then refined as in Example 2. Phenoxyethoxyethyl chlorobenzoylbenzoate distills above 250° C. at 10 mm. pressure.

*Example 6.—Methoxyethoxyethyl benzoylbenzoate.*—A mixture containing 680 grams o-benzoylbenzoic acid, 550 grams methoyethoxyethanol, 400 grams ethylene dichloride, and 3 cc. concentrated sulphuric acid was heated in the apparatus described in Example 2 until the theoretical amount of water had been removed. The product was then refined as in Example 2. Methoxyethoxyethyl benzoylbenzoate distills above 225° C. at 10 mm. pressure.

The esters prepared as above are light amber colored liquids or balsam-like resins having very high boiling points and being compatible with cellulose derivatives. Their compatibility with cellulose acetate is extremely great and of particular interest. They are readily soluble in ordinary lacquer solvents, making them suitable for use as plasticizers in cellulose derivative coating compositions. Other aromatic keto acids than those mentioned which may be used include acetyl benzoic, acetyl phthalic, toluyl benzoic, benzophenone dicarboxylic, p-phenyl-o-benzoylbenzoic, benzoylacetic, and chloronaphthoyl-benzoic acids, and other acids produced by replacing at least one hydrogen atom in the above mentioned acids by hydroxyl, chlorine, bromine, methyl, ethyl, alkoxyalkyl, or benzyl groups. Among other suitable ether alcohols may be mentioned the monoaryl or -alkyl ethers of ethylene glycol, propylene glycol, butylene glycol, and the monohydric alkyl and aryl ethers of glycerine, polglycerol, and other polyhydric alcohols, for example, diethylene, triethylene, and dibutylene glycols, triethyl ether of pentaerythrite, et cetera.

The following examples are given to illustrate typical coating compositions containing the esters of the present invention as plasticizers:

Example 7

|  | Parts |
|---|---|
| Cellulose nitrate | 12 |
| Damar | 3 |
| Ethoxyethyl benzoylbenzoate | 4 |
| Castor oil | 2.6 |
| Solvent | 166.5 |

Example 8

|  | Parts |
|---|---|
| Cellulose nitrate | 12 |
| Damar | 4 |
| Phenoxyethyl naphthoylbenzoate | 6.6 |
| Solvent | 166.5 |

Example 9

|  | Parts |
|---|---|
| Cellulose acetate | 12 |
| Methoxyethyl benzoylbenzoate | 6 |
| Solvent | 182 |

Example 10

|  | Parts |
|---|---|
| Nitrocellulose | 12 |
| Pigment | 16.3 |
| Damar | 3.5 |
| Castor oil | 3.6 |
| Methoxyethyl chlorobenzoylbenzoate | 4 |
| Solvent | 161.6 |

Example 11

|  | Parts |
|---|---|
| Benzyl cellulose | 12 |
| Ethoxyethyl benzoylbenzoate | 3 |
| Solvent | 120 |

Example 12

|  | Parts |
|---|---|
| Pyroxylin | 10 |
| Resin | 6 |
| Butoxyethyl benzoylbenzoate | 6 |
| Wax | 2 |
| Solvent | 170 |

The above coating compositions give tough, flexible, and very durable films and dry in approximately five minutes.

Example 13

|  | Parts |
|---|---|
| Cellulose nitrate | 1 |
| Cellulose acetate | 1 |
| Methoxyethoxyethyl benzoylbenzoate | 1 |
| Solvent | 15 |

This composition gives tough, flexible films which are less inflammable than ordinary cellulose nitrate films and consequently are considerably more desirable for certain purposes.

The following examples are given to illustrate typical plastic compositions containing the esters of the present invention as plasticizers:

Example 14

|  | Parts |
|---|---|
| Cellulose acetate | 100 |
| Methoxyethyl benzoylbenzoate | 40 |

Example 15

|  | Parts |
|---|---|
| Cellulose nitrate | 100 |
| Phenoxyethyl benzoylbenzoate | 35 |

Example 16

|  | Parts |
|---|---|
| Ethyl cellulose | 100 |
| Phenoxyethoxyethyl chlorobenzoylbenzoate | 15 |

Example 17

|  | Parts |
|---|---|
| Cellulose acetate | 100 |
| Methoxyethyl chlorobenzoylbenzoate | 60 |
| Pigment (including color) | 200 |

Example 18

|  | Parts |
|---|---|
| Cellulose nitrate | 100 |
| Ethoxyethyl naphthoylbenzoate | 50 |
| Pigment (including color) | 200 |

Example 19

|  | Parts |
|---|---|
| Cellulose acetate | 100 |
| Cellulose nitrate | 100 |
| Methoxyethoxyethyl benzoylbenzoate | 90 |

The above plastic compositions may be prepared with or without the usual volatile solvents, such as alcohol for the cellulose nitrate compositions, acetone for the cellulose acetate compositions, and toluol-alcohol for the ether compositions. It is to be understood that other cellulose derivatives may be used in both the coating and plastic compositions, such as cellulose proprionate, cellulose butyrate, cellulose aceto-butyrate, cellulose nitro-acetate, benzyl celluose, et cetera. Also, the new esters in the above examples may be replaced in part by other new esters described herein, or by one or more of the heretofore known plasticizers, such as triacetin, dimethyl phthalate, triphenyl phosphate, camphor, dibutyl phthalate, tricresyl phosphate, et cetera.

The process of preparing the esters described above is capable of considerable variation; an excess of the acid or an excess of the alcohol may be used, or the acid-alcohol may be present in molecular equivalents. Also, catalysts other than sulphuric acid may be used and solvents other than those mentioned may be used to remove the water and, if desired, the solvents may be employed without the use of a catalyst. The reaction is applicable generally to all aromatic keto acids, every acid falling within this group being suitable, so far as known. Obviously the temperature of the reaction may be varied widely, but is is usually determined by the type of solvent employed with the reaction mixture, and preferably is kept between 75° C. and 200° C.

In the coating and plastic compositions given above, other resins than damar may be employed, for example, ester gum and various synthetic resins, such as polyhydric alcohol-polybasic acid resins, and the like, may be used. Also pigments and fillers may be incorporated as desired.

The esters of the present invention may be used in the preparation of all types of compositions containing cellulose esters and cellulose ethers. Prominent uses of such compositions are lacquers for coating metal and wood, dopes for coating fabrics, moisture-proof lacquers for coating regenerated cellulose sheets, and, referring particularly to the plastic compositions, toilet ware, novelties, sheeting, rods, tubes, and the like.

The esters of the present invention are particularly suitable as plasticizers for cellulose derivatives due to their extremely low vapor pressures, which results in giving permanently flexible films and plastic masses. A further advantage of these esters lies in their good compatibility with cellulose acetate.

The ether alcohol esters of aromatic ketonic acids are likewise good plasticizers for resins. Examples of these latter are phenol-aldehyde resins, aldehyde-amine resins, aldehyde-urea resins, polyhydric alcohol-polybasic acid resins, cumarone resins, indene resins, styrene resins, casein plastics, staconic acid ester resins, etc. For the purpose of the present invention, these are conveniently classed with cellulose derivatives.

As many apparanetly widely different embodiments of this invention may be made without departing from the spirit and scope thereof, it is to be understood that the invention is not limited to the specific embodiments thereof except as defined in the appended claims.

I claim:
1. A composition of matter comprising cellulose acetate and methoxyethyl benzoylbenzoate.
2. A composition of matter comprising 2 parts by weight of cellulose acetate and 1 part by weight of methoxyethyl benzoylbenzoate, together with a solvent.

EMMETTE F. IZARD.